(12) United States Patent
Nelson (10) Patent No.: US 9,855,641 B1
(45) Date of Patent: Jan. 2, 2018

(54) CLAMPING DEVICE FOR PRECISION TOOLS

(71) Applicant: David Nelson, Attleboro, MA (US)

(72) Inventor: David Nelson, Attleboro, MA (US)

( * ) Notice: Subject to any disclaimer, the term of this patent is extended or adjusted under 35 U.S.C. 154(b) by 0 days.

(21) Appl. No.: 15/530,780

(22) Filed: Feb. 27, 2017

Related U.S. Application Data

(60) Provisional application No. 62/389,534, filed on Feb. 29, 2016.

(51) Int. Cl.
*A47B 96/00* (2006.01)
*B25B 5/10* (2006.01)
*F16M 13/02* (2006.01)
*F16M 11/04* (2006.01)
*F16B 2/12* (2006.01)

(52) U.S. Cl.
CPC ............... *B25B 5/109* (2013.01); *F16B 2/12* (2013.01); *F16M 11/046* (2013.01); *F16M 13/022* (2013.01)

(58) Field of Classification Search
CPC ............ B25B 5/003; B25B 5/10; B25B 5/102
See application file for complete search history.

(56) References Cited

U.S. PATENT DOCUMENTS

| | | | | |
|---|---|---|---|---|
| 1,429,050 A | * | 9/1922 | Sylvester | B25B 5/109 269/174 |
| 1,809,768 A | * | 6/1931 | Wetzler | B25B 5/003 269/220 |
| 3,222,055 A | * | 12/1965 | Cook | B25B 5/109 269/219 |
| 3,701,352 A | * | 10/1972 | Bosworth | A61B 17/32053 408/97 |
| 5,181,702 A | * | 1/1993 | Pettigrew | B25B 5/003 269/166 |
| 6,406,229 B1 | * | 6/2002 | Derrick | B25B 5/006 269/101 |

* cited by examiner

*Primary Examiner* — Amy Sterling (57) ABSTRACT

The present invention relates to a clamping device, and more specifically to a clamping device for precision instruments. It comprises first and second clamping jaws that are secured against a work surface by forces applied in opposite directions via a shank member and locking nut working along integrated first and second threaded bores. The clamping device provides superior rigidity in applications involving the stability of precision instruments.

6 Claims, 9 Drawing Sheets

CLAMPING DEVICE FOR PRECISION TOOLS

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 62/389,534 entitled "Clamping device for precision tools", naming David Nelson as inventor, filed Feb. 29, 2016.

FIELD OF THE INVENTION

This invention relates to a general purpose clamping device and more particularly to a multi-function clamp. The invention is designed to be clamped tightly, quickly and conveniently to the working surface of a table, a workbench, a surface plate or a machine tool. Yet the invention can be relocated easily for different configurations and can be removed without trouble after the work is finished. The working surface of the table or workbench can be made of wood, metal, stone and is preferable a stable hard surface to enable the clamping device to engage in an effective manner.

BACKGROUND OF THE INVENTION

In the fields of measuring, inspection, bonding, welding and machining, clamps are used for holding work pieces together or holding a work piece on a work surface. Various types of clamps are available, such as bar clamps, C-clamps, F-clamps and screw clamps. These clamps generally comprise a fixed arm with a fixed clamping pad, a movable arm with a clamping pad, or a fixed arm with a fixed clamping pad at one end and a movable clamping pad attached directly to the other end of the fixed arm. Bar clamps utilize a sliding arm over the fixed arm to clamp a work piece.

Different types of quick locking and quick releasing mechanisms for the sliding arm are available in the field. A C-clamp consists of a C-shaped fixed arm with a clamping pad at one end and a threaded rod at the other end, the threaded rod having a clamping pad at one end and a cranking handle at the other end. The movable arm of an F-clamp is a straight arm with one end sliding over the L-shape fixed arm and the other end feeding a threaded rod with a clamping pad. A screw clamp utilizes two parallel clamping arms opened and closed by two parallel screws.

To clamp a work piece to the surface of a work surface, these conventional clamps must be used at the edge of the work surface so that one of the clamping arms will cross over the edge and reach the bottom of the working surface of the bench.

Conventional clamps utilized for clamping at the edge of a work surface, when used for securing precision measuring instruments are less than ideal in supplying a rigid stable platform in applications that necessitate precise tolerances in the fields of measuring and inspection.

DETAILED DESCRIPTION OF THE INVENTION

The following detailed description illustrates the invention by way of example and not by way of limitation. This description will clearly enable one skilled in the art to make and use the invention, and describes embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

In view of the foregoing, it will be seen that the several objects of the invention are achieved and other advantageous results are obtained.

Figure 4:
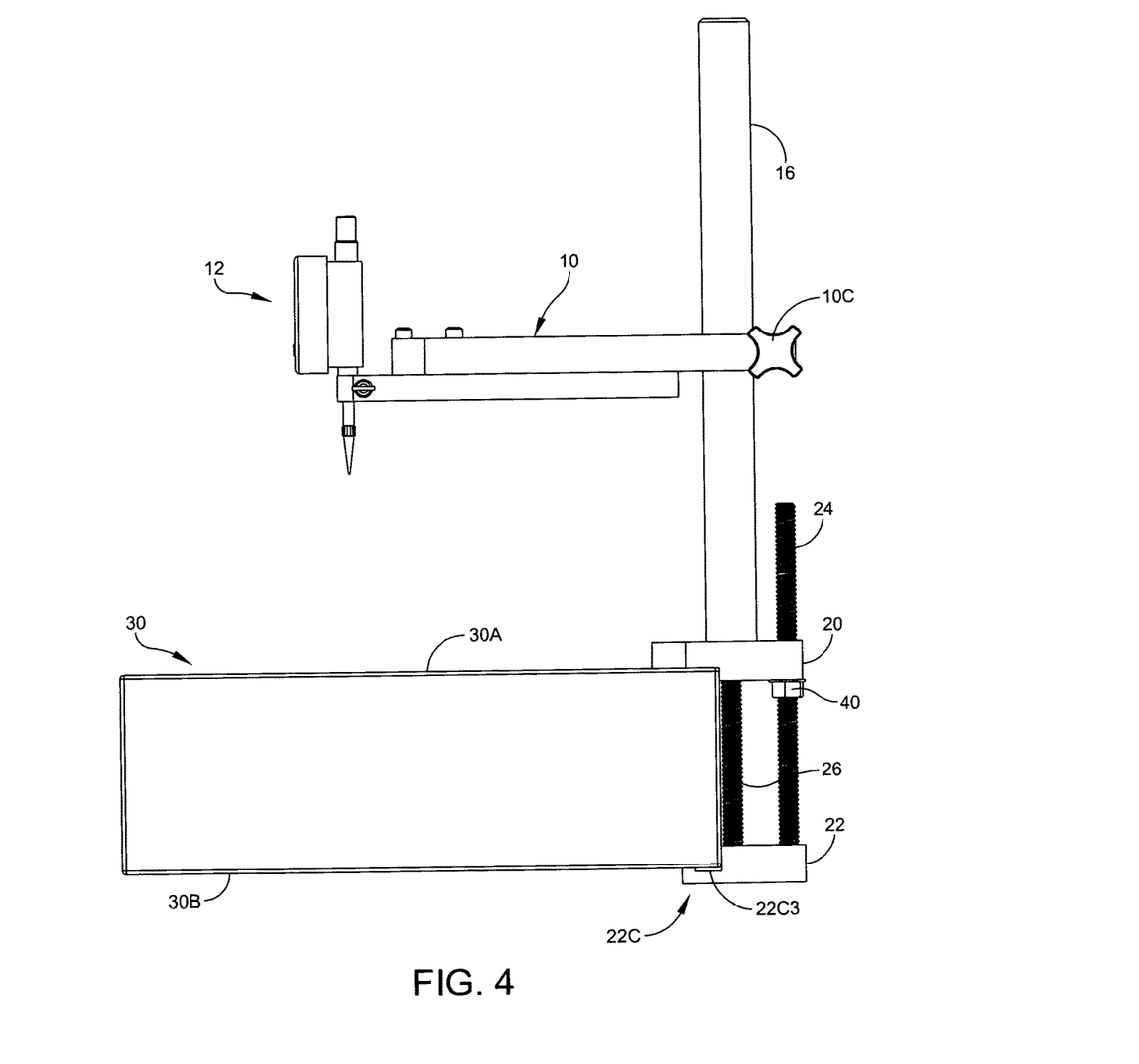
FIG. 4 illustrates the clamping device of FIG. 1 as mounted to a work surface.

Referring FIGS. 1 thru 7, an embodiment of the present invention is illustrated, depicting a clamping device 100. Device 100 includes a moveable arm 10 for attachment of a precision measuring device 12 (FIG. 4). The moveable arm 10 may be, constructed of a one piece aluminum alloy of ALUMINUM 6061-T6. Arm 10 is rotatable both vertically and horizontally about cylinder 16. Arm 10 may include various openings for connection of tools and implements, including connection apertures for the connection of digital tools such as a measuring instrument 12 (FIG. 4).

Figure 6:
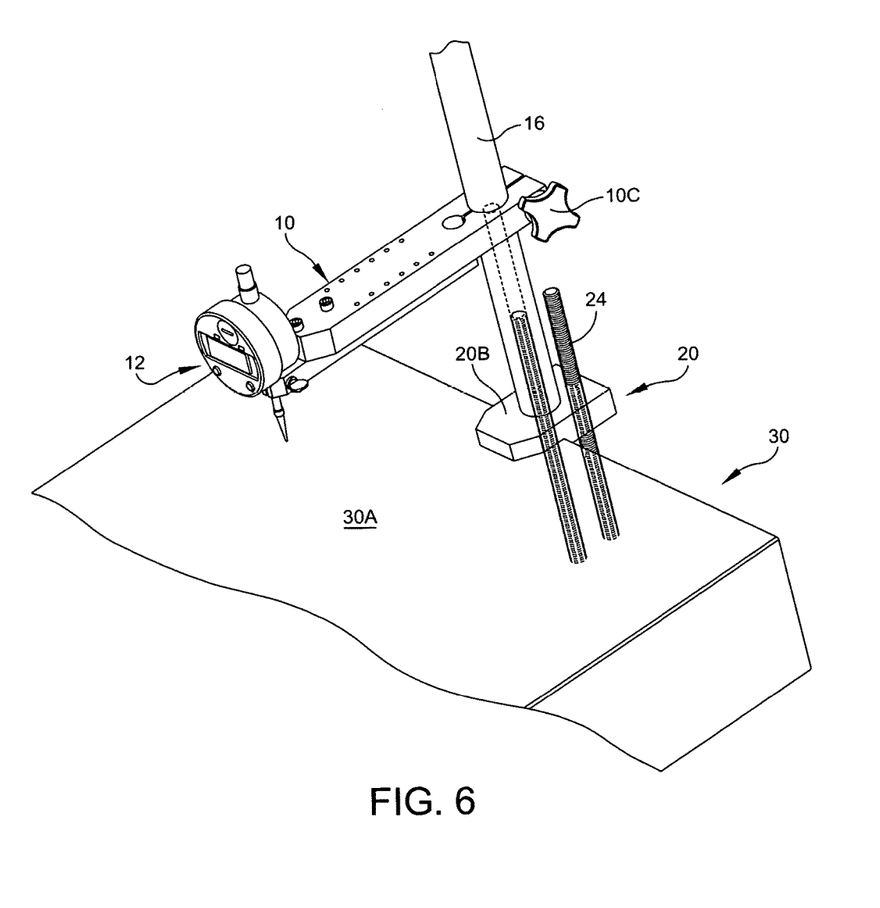
FIG. 6 illustrates the clamping device of FIG. 4, as shown with a measuring device attached thereto.
Figure 7:
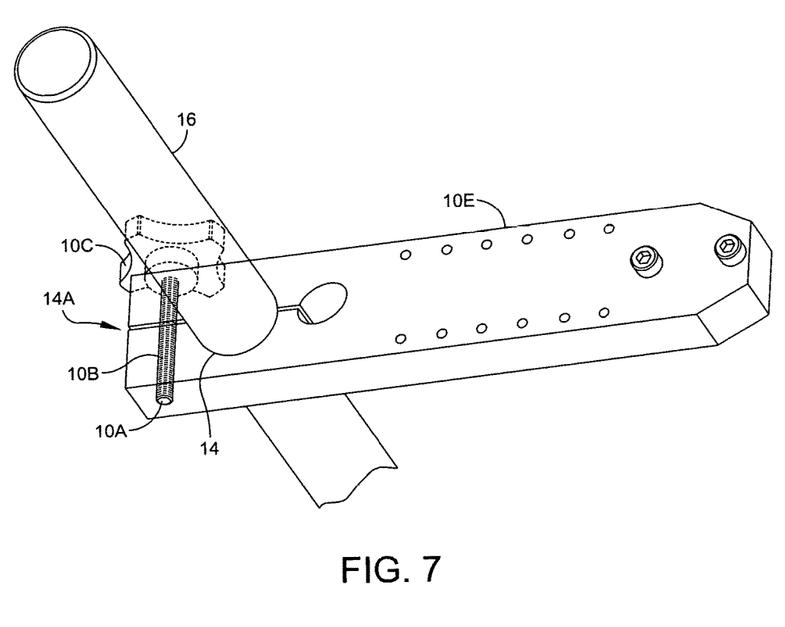
FIG. 7 illustrates an exploded view of the moveable arm of the clamping device of FIG. 1.
Figure 8:
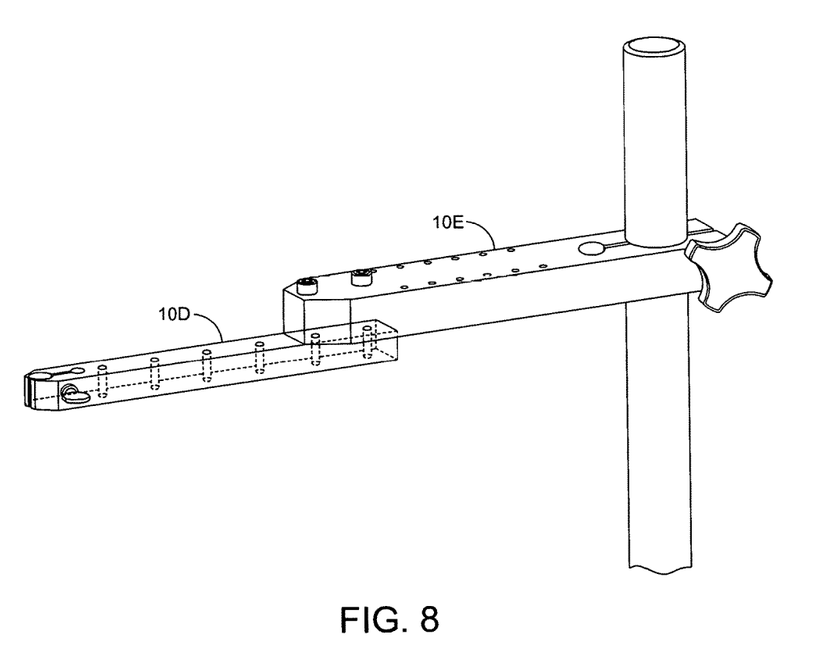
FIGS. 8 and 9 illustrate moveable arm 10 in an extended position.
Figure 9:
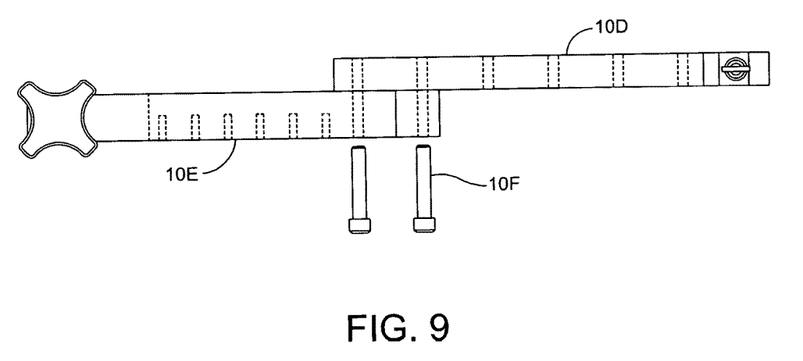

Arm 10 is further extendable as illustrated in FIG. 8,9 where second extension 10D may be extended and locked into place by screws 10F to allow for an extended reach for larger work surfaces 30 (see FIG. 6). Referring to FIG. 7, Arm 10 includes at least one opening 14 formed in first extension 10E. Extension 10E further includes a longitudinal channel 14A that bisects opening 14. The portions of extension 10E bisected by channel 14A are constricted via tightening screw 10B for securement of moveable arm 10 along shank 16. Tightening screw 10B is rotated via handle 10C to engage threaded bores 10A for constricting opening 14 against shank 16 (clockwise rotation) to secure movable arm 10 and to retract opening 14 to release moveable arm 10 when handle 100 is rotated counter-clockwise.

Figure 1:
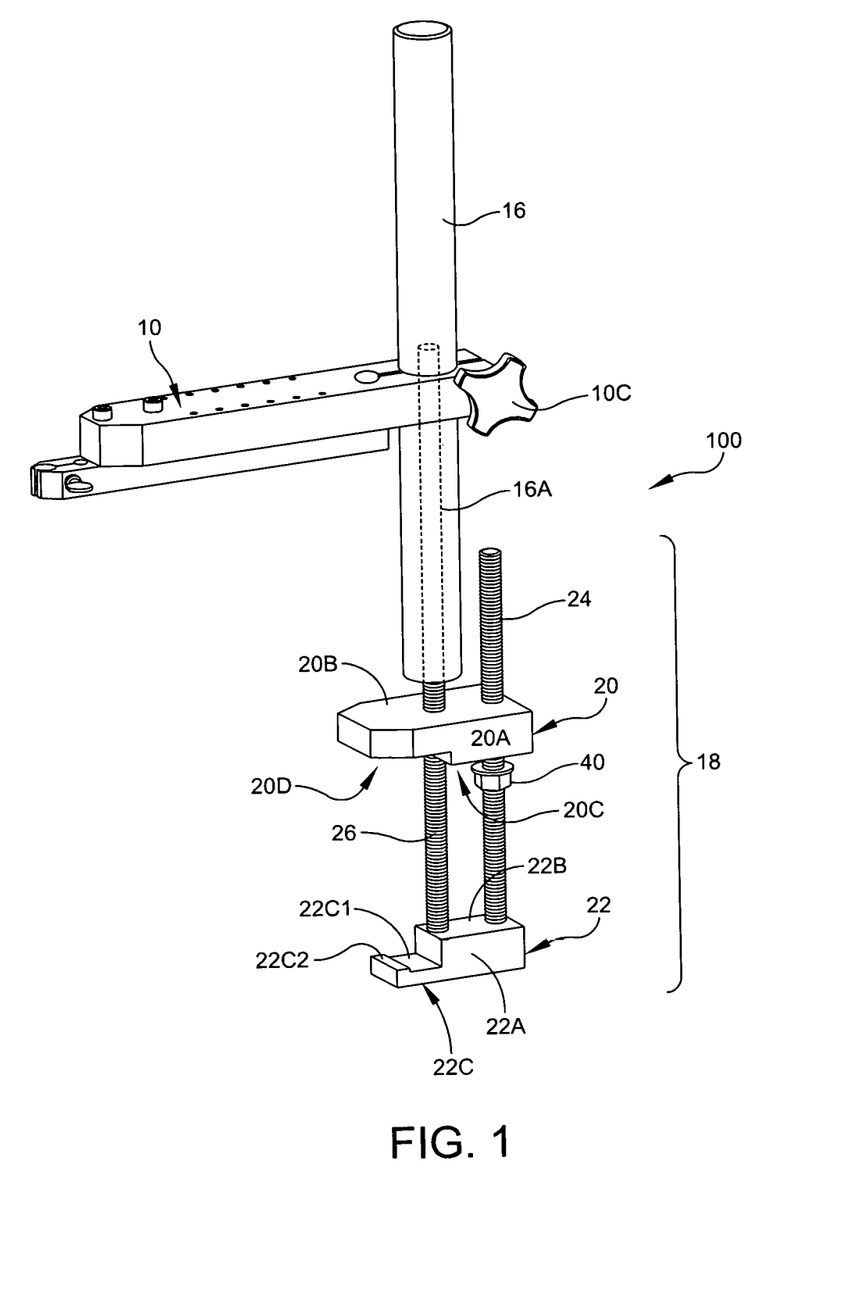
FIG. 1 illustrates a front perspective view of the clamping device of the present invention.
Figure 2:
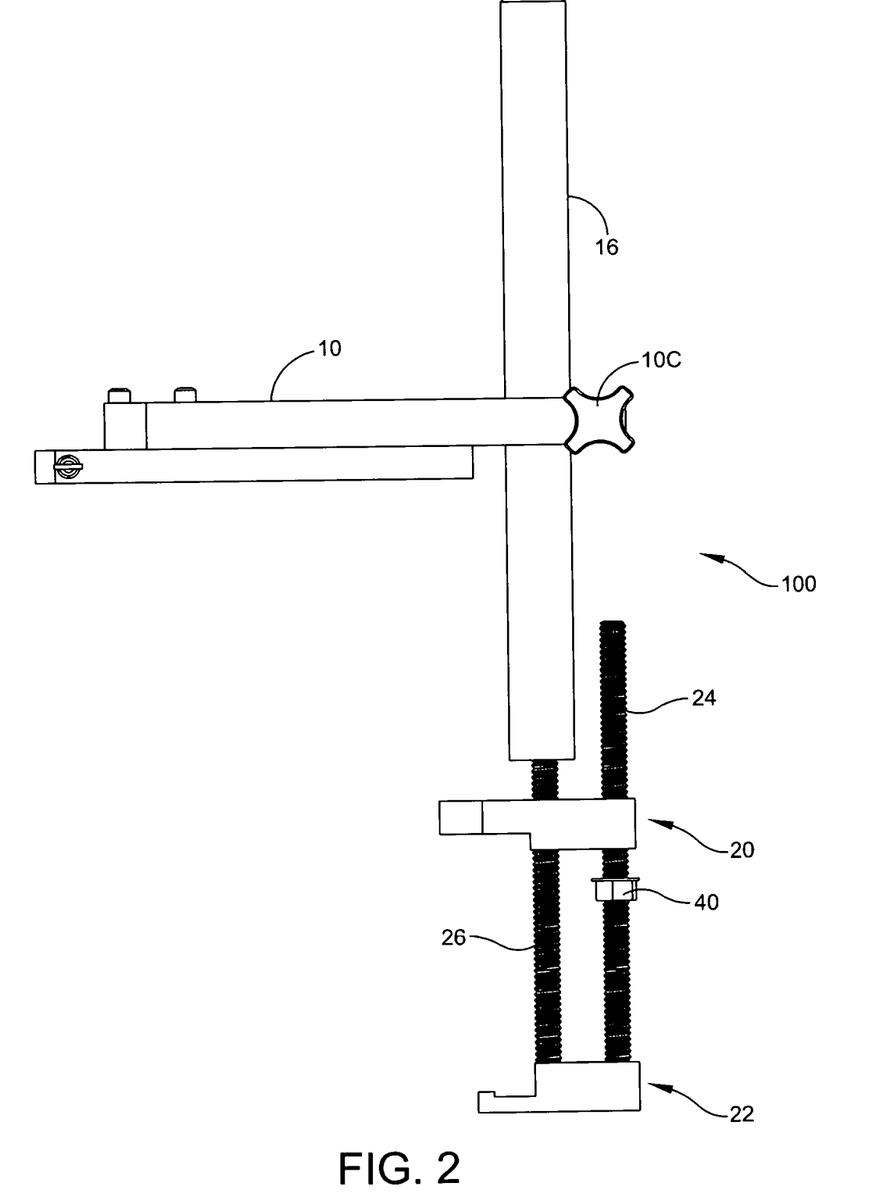
FIG. 2 illustrates a side view of the device of FIG. 1.
Figure 3:
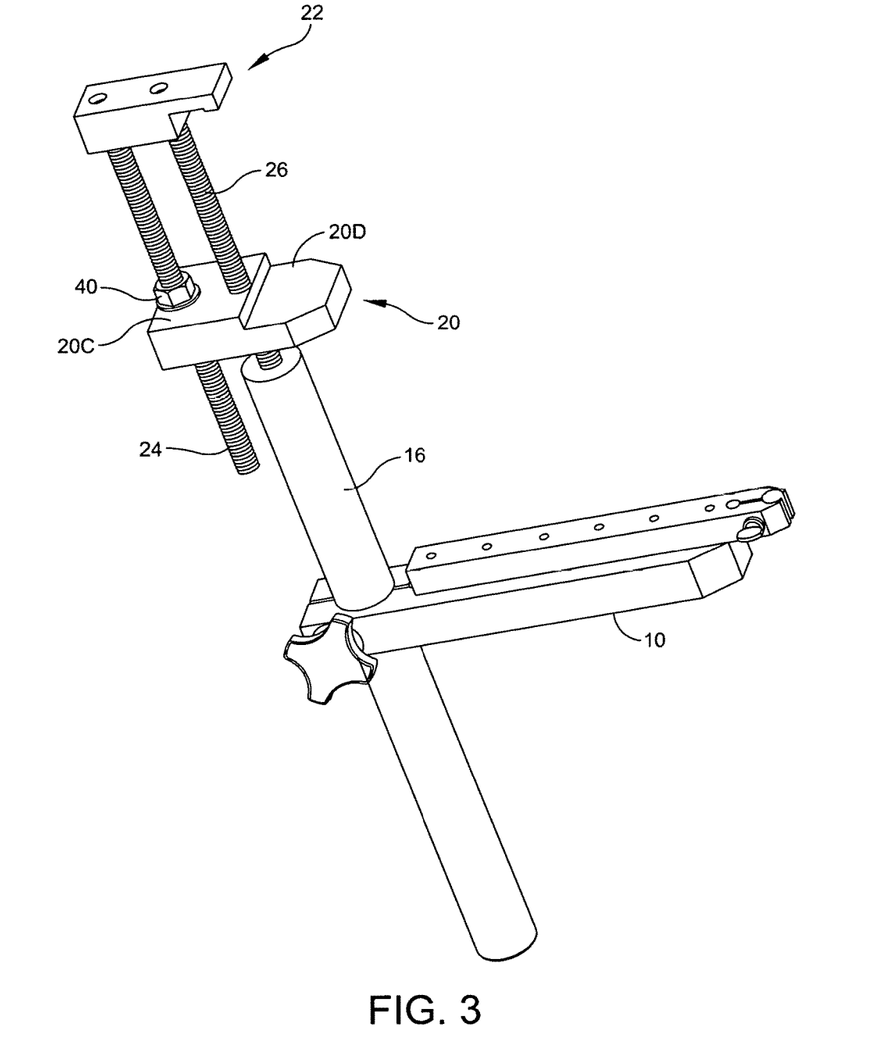
FIG. 3 illustrates bottom perspective view of the clamping device of FIG. 1.

Referring to FIG. 1, device 100 includes a work surface clamping assembly 18, having a first clamping jaw 20 and a second clamping jaw 22. The clamping assembly 18 may be constructed of ALUMINUM OR STEEL. Second clamping jaw 22 includes both first 24 and second 26 outwardly extending threaded guide rods that are at one end fixedly engaged into top surface 22B of second clamping jaw 22. Second clamping jaw 22 includes a base portion 22A having a top surface 22B that steps down to a second engagement extension 22C. Second engagement section 22C includes a base portion 22C1 that extends to an end lip 22C2.

First clamping jaw 20 includes a base portion 20A including openings for the pass through of the second end of the first 24 and second 26 guide rods that outwardly extend from second clamping jaw 22. First clamping jaw 20 can be freely positioned along the longitudinal length of first and second guide rods 24 and 26. First clamping jaw 20 base portion 20A includes a top surface 20B and a bottom surface 20C, surface 20C being opposite second clamping jaw 22 top surface 22B. Bottom surface 20C steps down to a base portion 20D that defines a first engagement extension. Bottom surface 20C step and top surface 22B step are in substantial alignment for positioning device 100 to a work surface.

Figure 5:
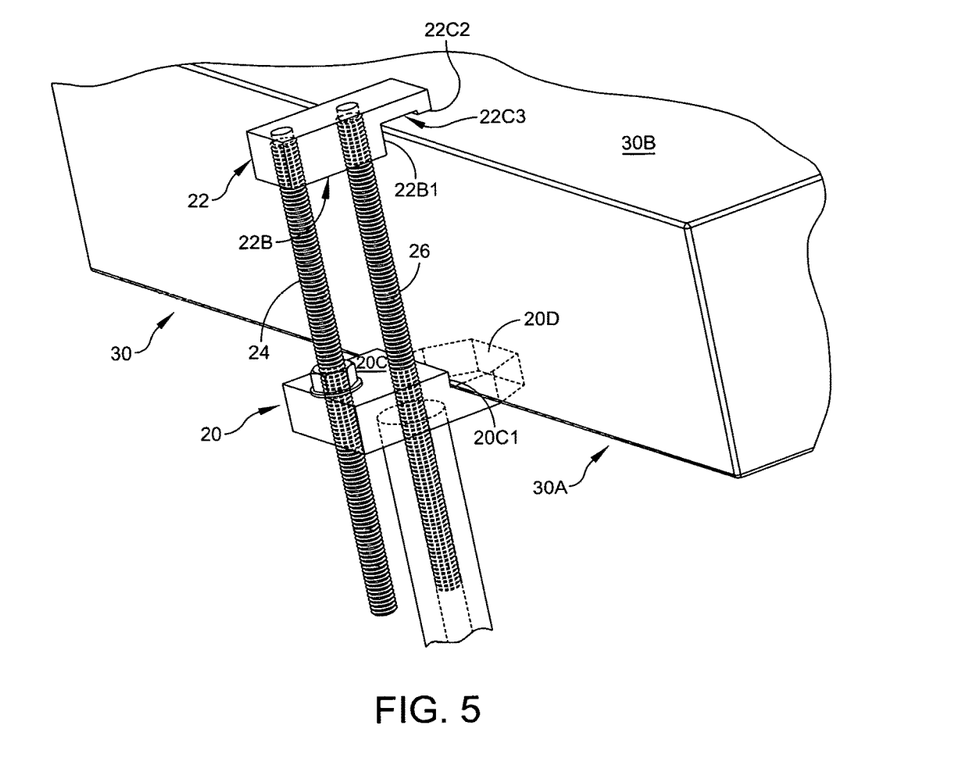
FIG. 5 illustrates an exploded view of the clamping device interface to a work surface.

Referring to FIG. 4, a work surface 30 is illustrated having a top surface 30A and a bottom surface 30B. The work surface may comprise just a solid slab material that is elevated to a position to allow for the engagement of both first and second clamping jaws 20 and 22. The clamping arrangement of the present invention is adaptable to engage the normal edge of a work surface as illustrated in FIG. 4-6. First clamping jaw 20 is slided along first and second guide rods 24 and 26 to adjust to the width of work surface 30. As illustrated in FIG. 5 and FIG. 6, top 30A and bottom 30B work surface edges slideably engage base portion 20D of first clamping jaw 20 and end lip 22C2 of second clamping jaw 22, up to a point of engagement with bottom surface 20C and top surface 22B step surface projections 20C1 and 22B1. It is noted that second threaded guide rod 26 is positioned in near proximity to the step engagement position to allow for maximum force projections at the point of first and second clamping jaw engagement of the top and bottom work surfaces.

Referring to FIG. 1 and FIG. 6, cylinder 16 includes an internal threaded bore 16A surrounded by a rigid aluminum or metal material. The cylinder 16 screwedly engages second threaded guide rod 26 with the cylinder 16 exerting a downward force against top surface 20B of first clamping arm 20 which forces base portion 20D of first clamping jaw 20 against top surface 30A. Threaded NUT 40 at the same time is adjusted to engage first threaded guide rod 24 to provide an upward force against bottom surface 20C of clamping jaw 20. These forces work together to provide an increased force against top surface 30A via engagement with engagement portion 20D.

Referring to FIG. 4 and FIG. 5, as a result of the forces exerted on first clamping arm 20 via cylinder 16 and threaded NUT 40, second clamping jaw 22 is forced upward at the point of fixed engagement with second threaded guide rod 26, and forced downward at the point of fixed engagement with first threaded guide rod 24. This combination of forces translates to an increased directional force against lip extension 22C2 that is further enhanced by recess 22C3 acting to allow a degree of bending second engagement section 22C.

I claim:

1. A clamping device for securement to a work surface, the work surface having a top, bottom and side surface, comprising:

first and second clamping jaws, said first and second clamping jaws including a top and bottom surface, said second clamping jaw positioned below said first clamping jaw;

first and second threaded rod members each having first and second rod ends, said first end of said first and second threaded rod members adapted to be threadably mounted at said second clamping jaw top surface, said first and second threaded rod members extending substantially vertically away from said second clamping jaw top surface;

said first clamping jaw adapted to slideably engage said first and second threaded rod members, said first clamping jaw moveable towards said second clamping jaw to engage said side surface of said work surface;

a generally straight shank member including a threaded bore therein, said shank adapted to screwedly engage said first rod member second end, said shank exerting a downward force against said top surface of said first clamping jaw to grip said work surface top and bottom surface between said bottom surface of said first clamping jaw and said top surface of said second clamping jaw, said downward force against said top surface of said first clamping jaw pulling said second clamping jaw upward, a threaded locking element adapted to scewably engage said second rod member, said locking element exerting an upward force against said first clamping jaw bottom surface, pushing said second clamping jaw downward, wherein said bottom surface of said first clamping jaw further includes a first bottom surface and a second bottom surface, said second bottom surface stepped down from said first bottom surface, said step forming an orthogonal sidewall, said second bottom surface for engagement with said top surface of said work surface up to a point where said side surface engages said sidewall, and wherein said bottom surface of said second clamping jaw further includes a first bottom surface and a second bottom surface, said second bottom surface stepped down from said first bottom surface, said step forming an orthogonal sidewall, said second bottom surface extending to an end lip portion, said end lip portion having a top surface for engagement with said bottom surface of said work surface, said engagement continuing up to a point when said work surface side surface engages said orthogonal sidewall, and wherein said end lip portion top surface is raised above said second bottom surface to form an engagement recess, and wherein said upward force of said locking element and said downward force of said shank member allows said bottom surface of said work surface to seat within said engagement recess.

2. A clamping device for securement to a work surface, the work surface having a top, bottom and side surface, as in claim 1, further comprising:

a moveable arm member including first and second arm ends, said first arm end adapted to be slideably mounted on said shank member.

3. A clamping device for securement to a work surface, the work surface having a top, bottom and side surface, as in claim 2, wherein said first arm end further includes an opening, said opening to receive said shank member therein, said arm member having securement means for positioning said arm member at varying positions along said shank member.

4. A clamping device for securement to a work surface, the work surface having a top, bottom and side surface, comprising:
   first and second clamping jaws, said first and second clamping jaws including a top and bottom surface, said second clamping jaw positioned below said first clamping jaw;
   first and second threaded rod members each having first and second rod ends, said first end of said first and second threaded rod members adapted to be threadably mounted at said second clamping jaw top surface, said first and second threaded rod members extending substantially vertically away from said second clamping jaw top surface;
   said first clamping jaw adapted to slideably engage said first and second threaded rod members, said first clamping jaw moveable towards said second clamping jaw to engage said side surface of said work surface, said second rod member further including a threaded locking element screwedly engaged thereon, said locking element exerting an upward force against said first clamping jaw bottom surface;
   a generally straight shank member including a threaded bore therein, said shank adapted to screwedly engage said first rod member second end, said shank exerting a downward force against said top surface of said first clamping jaw to grip said work surface top and bottom surface between said bottom surface of said first clamping jaw and said top surface of said second clamping jaw,
said downward force against said top surface of said first clamping jaw pulling said second clamping jaw upward,
   a threaded locking element adapted to screwably engage said second rod member, said locking element exerting an upward force against said first clamping jaw bottom surface, pushing said second clamping jaw downward.

5. A clamping device for securement to a work surface, the work surface having a top, bottom and side surface, as in claim 4, further comprising:
   a moveable arm member including first and second arm ends, said first arm end adapted to be slideably mounted on said shank member, said second arm end adapted to fixedly attach an instrument.

6. A clamping device for securement to a work surface, the work surface having a top, bottom and side surface, as in claim 4,
   wherein said bottom surface of said first clamping jaw further includes a first bottom surface and a second bottom surface, said second bottom surface stepped down from said first bottom surface, said step forming an orthogonal sidewall, said second bottom surface extending to an end lip portion, said end lip portion having a top surface for engagement with said bottom surface of said work surface, said engagement continuing up to a point when said work surface side surface engages said orthogonal sidewall, and
wherein said end lip portion top surface is raised above said second bottom surface to form an engagement recess, and wherein said upward force of said locking element and said downward force of said shank member allows said bottom surface of said work surface to seat within said engagement recess.

* * * * *